(12) United States Patent
Anwer et al.

(10) Patent No.: US 12,513,845 B2
(45) Date of Patent: Dec. 30, 2025

(54) ELECTRONICS ENCLOSURE AND EXPANSION CARD WITH COANDA VENT RIBS

(71) Applicant: ATI Technologies ULC, Thornhill (CA)

(72) Inventors: Ahmed Abdul Wadood Anwer, Thornhill (CA); Jabir H. Yusufali, Thornhill (CA)

(73) Assignee: ATI Technologies ULC, Markham (CA)

( * ) Notice: Subject to any disclaimer, the term of this patent is extended or adjusted under 35 U.S.C. 154(b) by 229 days.

(21) Appl. No.: 18/216,503

(22) Filed: Jun. 29, 2023

(65) Prior Publication Data

US 2024/0172385 A1     May 23, 2024

Related U.S. Application Data

(60) Provisional application No. 63/427,035, filed on Nov. 21, 2022.

(51) Int. Cl.
| | |
|---|---|
| *G06F 1/16* | (2006.01) |
| *H05K 5/00* | (2025.01) |
| *H05K 7/00* | (2006.01) |
| *H05K 7/14* | (2006.01) |

(52) U.S. Cl.
CPC ............................. *H05K 7/1417* (2013.01)

(58) Field of Classification Search
CPC .. H05K 7/1417; H05K 7/1418; G06F 1/1656; G06F 1/1684; G06F 1/185; G06F 1/186; G06F 1/183
See application file for complete search history.

(56) References Cited

U.S. PATENT DOCUMENTS

| | | | |
|---|---|---|---|
| 6,512,672 B1 * | 1/2003 | Chen .................. | H05K 7/20563 361/695 |
| 7,826,212 B2 * | 11/2010 | Shogan ..................... | G06F 1/20 361/679.46 |
| 9,547,343 B2 * | 1/2017 | Cho .......................... | G06F 1/20 |
| 2004/0252453 A1 * | 12/2004 | Brooks .............. | H05K 7/20718 361/679.51 |

* cited by examiner

*Primary Examiner* — Anthony M Haughton
(74) *Attorney, Agent, or Firm* — Patterson + Sheridan, LLP

(57) ABSTRACT

A support bracket for an expansion card and an electronic enclosure are disclosed that have ribs formed between vent openings that promote improved airflow through the vent openings as compared to conventional stamped and deburred ribs.

20 Claims, 7 Drawing Sheets

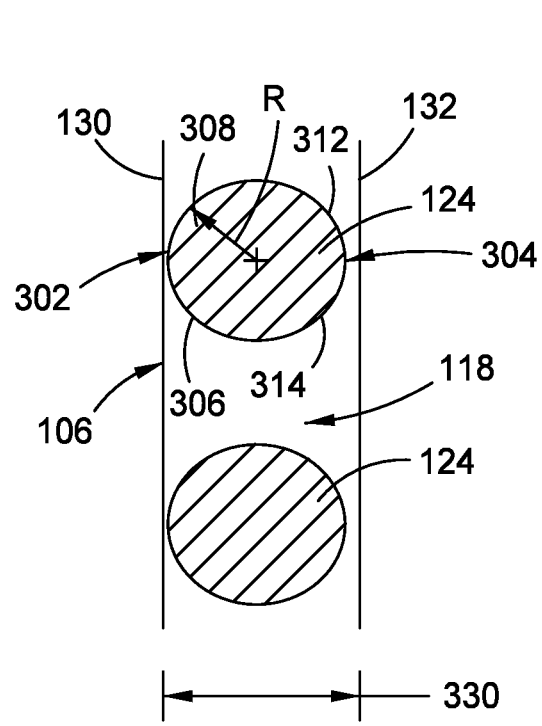
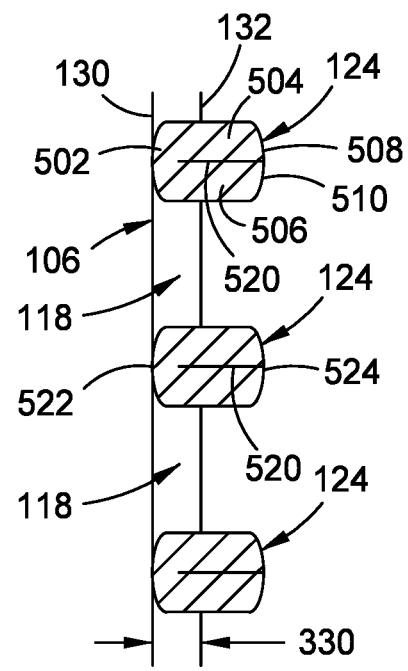
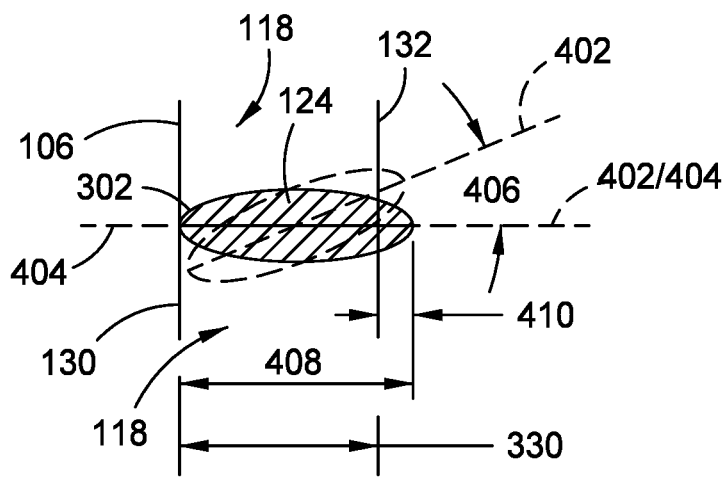
FIG. 3
FIG. 5
FIG. 4

ELECTRONICS ENCLOSURE AND EXPANSION CARD WITH COANDA VENT RIBS

RELATED APPLICATIONS

This application claims benefit from U.S. Provisional Patent Application Ser. No. 63/427,035, filed Nov. 21, 2022, the contents of which are incorporated by reference in its entirety.

TECHNICAL FIELD

Embodiments of the present invention generally relate to an expansion card for interfacing with a computer motherboard, and in particular, to an expansion card having ribs that encourage a Coanda effect for venting air passing through vent openings in, on, or near the bracket of the expansion card.

Embodiments of the present invention also relate to electronics enclosures having ribs that encourage a Coanda effect for venting air passing through vent openings in, on, or near the enclosure. Some examples of electronics enclosures include antenna housings, mobile telephones, laptop chassis, server chassis, computer chassis, gaming consoles, and the like.

BACKGROUND

Computing systems, such as computers, control systems, automated teller machines, data centers, artificial intelligence systems, and machine learning systems among others, often employ one or more expansion cards connected to a computer's motherboard to add functionality to the computing system. Typically, expansion cards are removable such that specific functionality provided by the circuitry of the expansion card can be added as desired to the computing system.

One edge of the expansion card includes edge contacts that fit into a mating socket disposed on the motherboard of the computing system. The edge contacts electrically connect the functional circuitry of the expansion card with the electronics disposed on or otherwise coupled to the motherboard. Peripheral expansion cards may additionally have communication ports for accepting external cables. In most expansion cards, the communication ports are located on a support bracket that secures the expansion card to a housing of the computing system.

The support bracket of the expansion cards often includes a plurality of vent openings that allow cooling air to access the electronics mounted to the expansion card and/or allow air heated by the expansion card electronics to be vented from the computing system. When the vent openings are spaced close together, the vent openings are separated by ribs. The ribs, in addition to providing structural rigidity, may also function to shield electromagnetic interference (EMI), provide safety barrier to prevent touching of hot internal components, or also to provide a fire screen to prevent ashes and embers generated in the computing system from exiting through the bracket and becoming an ignition source. Larger vent openings provide better cooling performance, but at the cost of reduced EMI and safety performance. Additionally, larger openings undesirably allow more noise to escape the computing system.

Vent openings in electronics enclosures have similar problems.

Therefore, a need exists for an improved expansion card and improved electronics enclosure.

SUMMARY

A support bracket for an expansion card and electronic enclosures are disclosed that has ribs formed between vent openings that promote improved airflow through the vent openings as compared to conventional stamped and deburred ribs.

In one example, the ribs include an airflow enhancing sectional area that is, in some embodiments, formed post-stamping. In the embodiments, the enhancing sectional area of the ribs are formed during stamping or at other times during the fabrication of the bracket. In one example, the top side (the side that the bracket or enclosure was stamped, e.g., punch side, the bottom side being the burr side) of the ribs are cold worked to round the top side edges of the ribs. In another example, both the top and bottom sides of the ribs are cold worked to round the top and bottom side edges of the ribs.

In another example, the ribs include airflow enhancing sectional area that has a radius that is 25 percent or more than the material thickness of the rib. The radius may be a full radius. The radius of the rib may be on one or both of the outside or board side of body.

In another example, the ribs include airflow enhancing sectional area that has a chord length that is longer than the rib is wide.

In another example, the ribs include airflow enhancing sectional area that extends beyond the broad side of the body. The airflow enhancing sectional area may optionally be folded. The airflow enhancing sectional area may optionally have a foil shape.

In yet another example, a method for forming an expansion card bracket is provided. The method includes forming openings in a metal blank, the adjacent openings separated by an initial rib; and rotating legs of the initial rib to a parallel orientation to form a rib separating two adjacent openings.

BRIEF DESCRIPTION OF THE DRAWINGS

FIG. 3 is a partial sectional view of one example of ribs of an expansion card bracket.

FIG. 4 is a partial sectional view of another example of ribs of an expansion card bracket.

FIG. 5 is a partial sectional view of another example of ribs of an expansion card bracket.

DETAILED DESCRIPTION

Examples of support brackets for expansion cards and electronic enclosures are disclosed herein that has ribs formed between vent openings that promote improved airflow through the vent openings as compared to conventional stamped and deburred ribs. The air flow enhancing sectional shape of the ribs, whether present in a bracket or an electronic enclosure, allows greater airflow with closer rib spacing (i.e., smaller vent holes) without sacrificing EMI protection. The close rib spacing allows enhanced fire protection and provides a finger guard that substantially prevents touching of the hot components within the computing system. Moreover, the close rib spacing reduces undesirable noise by making the flow more aerodynamic with less turbulence.

Figure 1:
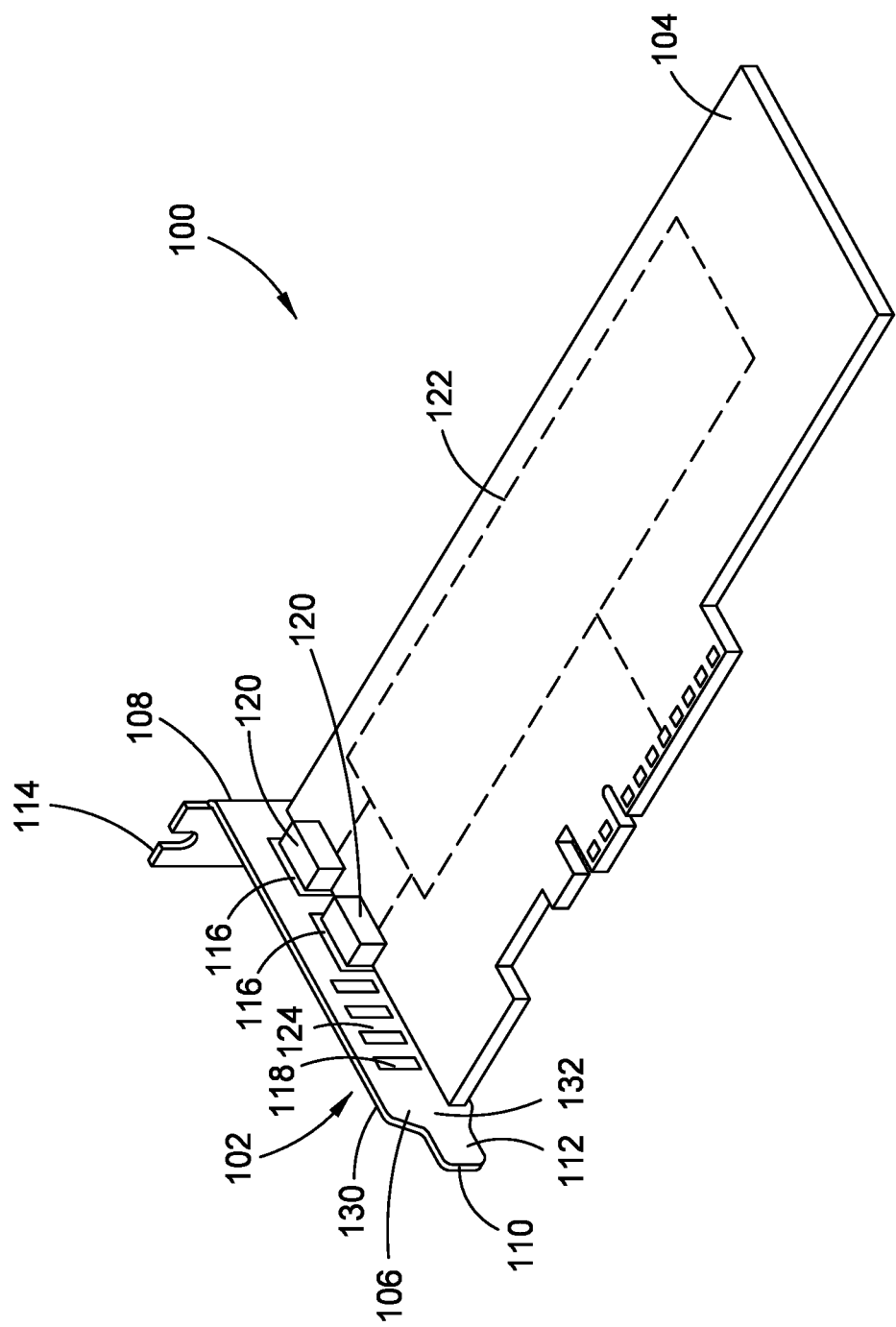
FIG. 1 is a prospective view of an expansion card having a bracket containing airflow enhancing ribs.
Figure 2:
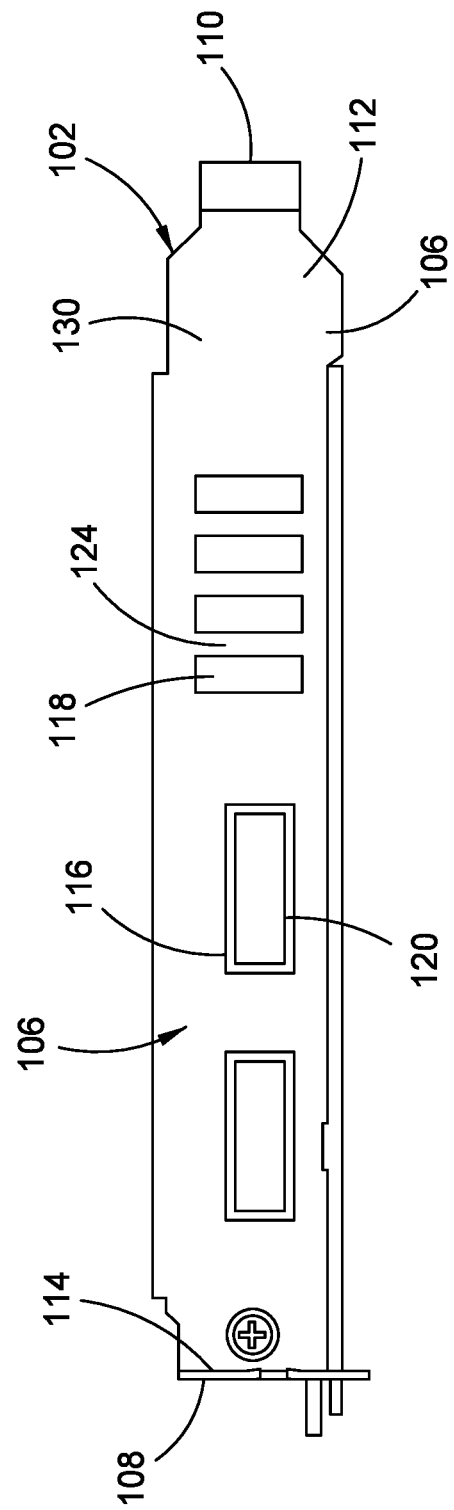
FIG. 2 is a front view of the expansion card of FIG. 1.

As illustrated in FIGS. 1 and 2, an expansion card bracket 102 of an expansion card 100 generally includes an elongated body 106 to which printed circuit board (PCB) 104 is mounted. The PCB can be mounted to the body using screws or other techniques, and the body may include holes and/or mounting tabs for receiving the PCB.

The elongated body of the bracket extends between a first end 110 and a second end 108, and has a first surface 130 and a second surface 132. When the bracket 102 is made by stamping, one of the first and second surfaces 130, 132 is the punch side of the elongated body, while the other of the first and second surfaces 130, 132 is the burr side of the elongated body.

The first end has an insertion tab 112. The insertion tab is generally narrower than a width of the body, and is generally coplanar or substantially coplanar with the plane of the body.

The second end of the elongated body has a mounting tab 114. The mounting tab is formed at an angle relative to the plane of the body. For example, the mounting tab may be oriented at about 90 degrees relative to the plane of the body. The mounting tab 114 may include holes or slots for interfacing with a fastener.

The elongated body of the bracket may also include communication port openings 116 for sockets 120 that are coupled to the electronics (IC chips, surface mounted passive and active circuit components, and the like) 122 disposed on the PCB. The electronics 122 are configured to allow the expansion card 100 to be an audio card, a sound card, a video card (such as a graphics card or display card), a network interface card, a serial and parallel cards, a USB expansion card, a Firewire card (such as a IEEE 1394 interface connection), a storage card, a modem card, a wireless card, a cellular card, a TV tuner card, and a video capture card, among others. The communication port openings enable cables from devices external to the computing system in which the expansion card is mounted to engage sockets coupled to the PCB.

The elongated body of the bracket also includes plurality of vent openings 118 formed through the elongated body. The vent openings extend through the first and second surfaces of the body. Depending on the orientation of the body during the stamping of the vent openings, one surface of the elongated body is the punch side and the opposite surface of the body is the burr side. Immediately adjacent ones of the vent openings are separated by ribs 124. The ribs are generally within the plane of the body. However, in some embodiments described below, a portion of the ribs may extend beyond one or both surfaces 130, 132 of the body 106.

The ribs 124 may have any shape as dictated by the shape of the vent openings 118. For example, the ribs 124 may be bars when the vent openings 118 are rectangular, as shown in FIGS. 1 and 2. The ribs 124 may also be in the form of a perforated web when the vent openings 118 are an array of circular holes, hexagons or other polygonal shape. The ribs 124 may also have other forms dictated by the shape and geometric arrangement of the vent openings 118.

FIG. 3 is a partial sectional view of elongated body illustrating the one of the ribs 124 in cross section. The ribs 124 has a first side surface 302 and a second side surface 304. The first side surface 302 faces the same direction as the first surface 130 of the elongated body, while the second side surface 304 faces the same direction as the second side 132 of the elongated body. In one example, edges 306, 308 of the first side surface 302 adjacent the vent openings 118 are rounded. In another example, the edges 312, 314 of the second side surface 304 adjacent the vent openings 118 are rounded. In yet another example, the edges 306, 308, 312, 314 of the first and second side surfaces 302, 304 adjacent the vent openings 118 are rounded. The radii of the edges 306, 308 of the first side surface 302 may be the same, larger or smaller than the radii of the edges 312, 314 of the second side surface 304. In one example, the radii of the edges 306, 308 of the first side surface 302 is larger than the radii of the edges 312, 314 of the second side surface 304. In some examples, one or both of the first side surface 302 and the second side surface 304 have a full radius.

In one example, the radii (R) of the edges 306, 308 of the first side surface 302 is at least 25 percent of a thickness of the body 106. Alternatively or additionally, the radii (R) of the edges 312, 314 of the second side surface 304 is at least 25 percent of a thickness of the body 106.

In other examples, the radii (R) of the edges 306, 308 of the first side surface 302 is at least 25 percent of a width of the rib 124 (as measure from adjacent vent openings 118 across the rib 124). Alternatively, or additionally, the radii (R) of the edges 312, 314 of the second side surface 304 is at least 25 percent of the width of the rib 124.

In other examples such as illustrated in FIG. 4, the cross section of the ribs 124 have a foil shape. The foil shape rib may have a chord line 402 that is perpendicular to an imaginary line 404 extending normally from the first side surface 302 of the elongated body 106 of the expansion card bracket 102. In other examples, the chord line 402 forms an acute angle 406 with the imaginary line 404 extending normally from the first side surface 302 of the elongated body.

In other examples, the cross section of the ribs 124 extends beyond the first and/or second surfaces 130, 132 of the elongated body 106. That is, the ribs 124 has a length 408 that is longer than a thickness of the body, such that the rib 124 extends a distance 410 beyond one or both of the first and second surfaces 130, 132. In such examples, the rib may have a foil shape, a tear-drop shape, an oval shape or other flow enhancing (compared to rectangular) sectional shape. In some examples, the rib may be folded back on itself as shown in the attached appendix. The longer rib (relative to the thickness of the body) generally improves EMI shielding.

The cross section of the ribs 124 may be formed post stamping by any suitable process. In one example, the post stamping cross section of the ribs 124 is formed using a cold working process. Suitable cold working processes include stamping, pressing, and coining, among others. When the expansion card bracket 102 is formed by other technics, such as die casting, molding, 3D printing, the Coanda enhancing cross sectional shape of the ribs 124 may be part of the bracket formation process.

In other examples such as illustrated in FIG. 5, the cross section of the ribs 124 includes a fold 520. The rib 124 includes a base section 502 connecting two legs 504, 506. The legs 504, 506 extend in a common parallel direction from the base section 502. Distal ends 508, 510 of the legs 504, 506 are disposed adjacent each other such that the legs 504, 506 define the fold 520 therebetween. The rib 124 with the fold 520 may have any suitable shape. In the example depicted in FIG. 5, the rib 124 has a foil shape such that the fold 520 is perpendicular the first side surface 130 of the elongated body 106 of the expansion card bracket 102. In other examples, the fold 520 forms an acute angle with the first side surface 130 of the elongated body 106.

In other examples, the distal ends 508, 510 of the legs 504, 506 extends beyond the first and/or second surfaces 130, 132 of the elongated body 106. That is, the ribs 124 has a length that is longer than a thickness of the body, such that the rib 124 extends a distance beyond one or both of the first and second surfaces 130, 132. In such examples, the rib may have a foil shape, a tear-drop shape, an oval shape or other flow enhancing (compared to rectangular) sectional shape.

Figure 6:
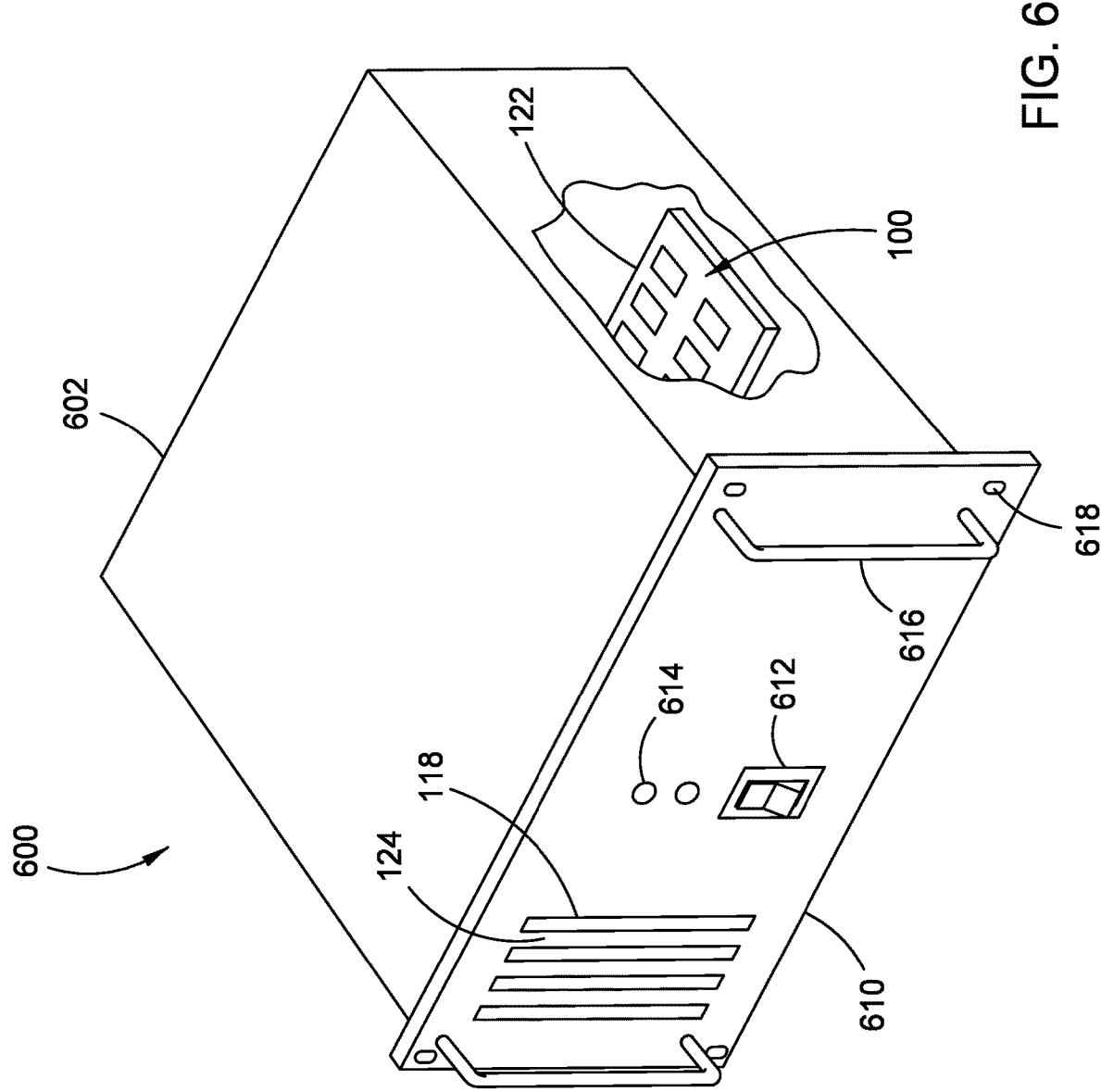
FIG. 6 is a prospective view of an electronics enclosure having a housing containing airflow enhancing ribs separating a plurality of vent openings.

FIG. 6 is a prospective view of an electronics enclosure 600 containing airflow enhancing ribs 124 separating a plurality of vent openings 118. Electronics 122 are mounted within a housing 602 of the electronics enclosure 600. Some of the electronics 122 may be mounted on an expansion card 100, as described above. The electronics enclosure 600 may be an antenna housing, mobile telephone, laptop chassis, server chassis, computer chassis, gaming console, and the like.

A mounting plate 610 is connected to a housing 602. The mounting plate 610 generally allows the electronics enclosure 600 to mount to a server rack or other structure, for example, using mounting holes 618 formed through the mounting plate 610. The mounting plate 610 may include indicator lights 614, one or more switches 612, one or more handles 616, and the plurality of vent openings 118 separated by the airflow enhancing ribs 124. The ribs 124 and vent openings 118 may be configured as described above. The vent openings 118 allow improved airflow into and out of the electronics enclosure 600.

Figure 7A:
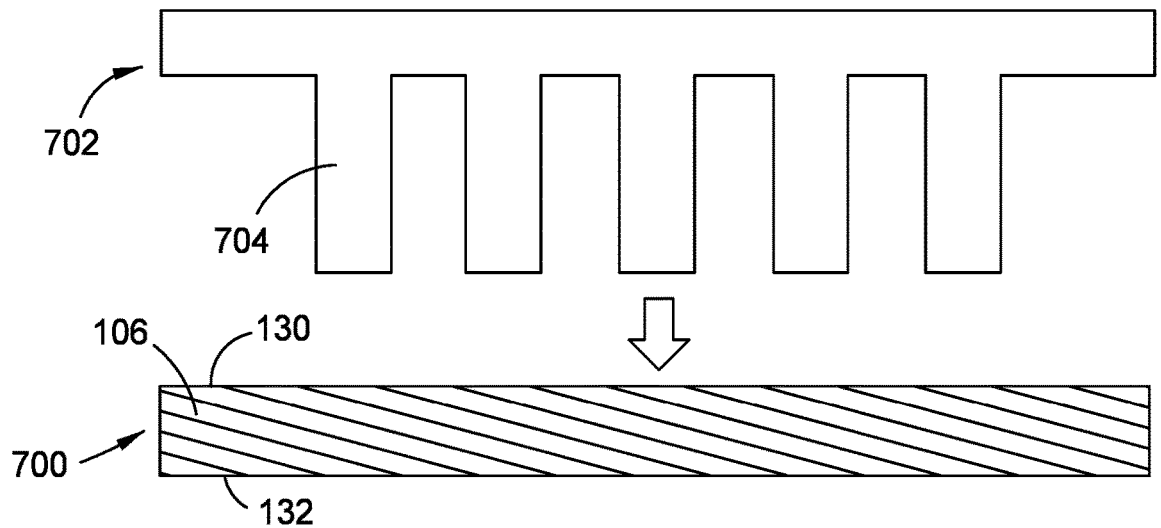
FIGS. 7A-7E are partial sectional views of another example an expansion card bracket during different stages of fabrication.

FIGS. 7A-7E are partial sectional views of another example an expansion card bracket 102 during different stages of fabrication. Referring first to FIG. 7A, a blank 700 from which the expansion card bracket 102 is to be formed in placed in a stamping press below a punching tool 702. Only the punching tool 702 of the stamping press is shown in FIG. 7A, but it is understood that the elongated body 106 of the blank 700 is supported on a die and that the punching tool 702 is attached to a ram.

Figure 7B:
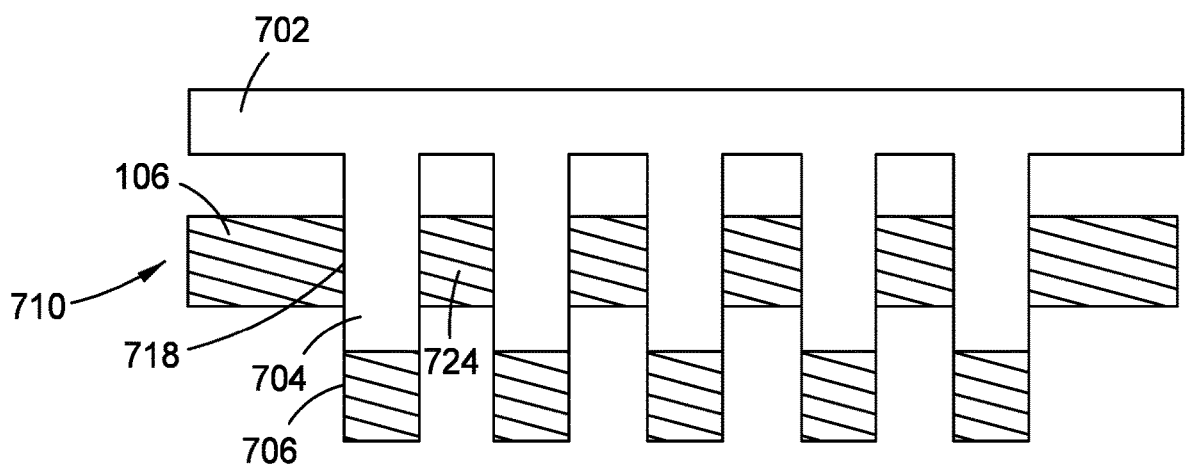
Figure 7C:
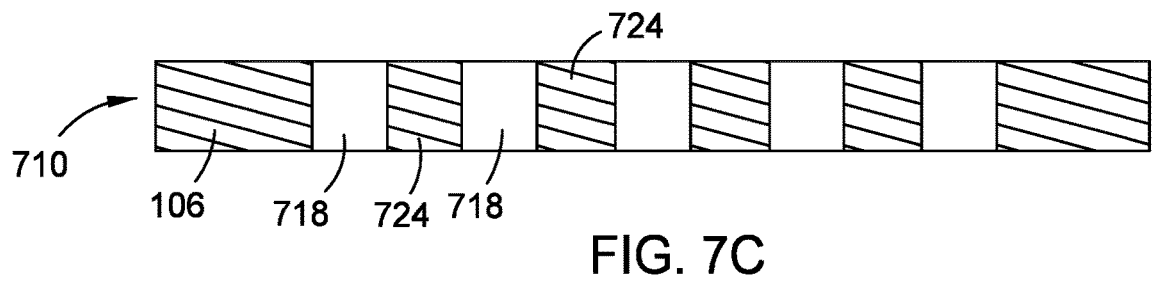

The punching tool 702 includes a plurality of punches 704. The punches 704 are driving by the ram as shown by the arrow depicted in FIG. 7A. As the ram causes the punches 704 to pierce the elongated body 106 of the blank 700, slugs 706 of punched out material are removed from the elongated body 106, leaving initial ribs 724 separated by initial openings 718 to form a semi-finished blank 710 from the blank 700, as illustrated in FIGS. 7B and 7C.

Figure 7D:
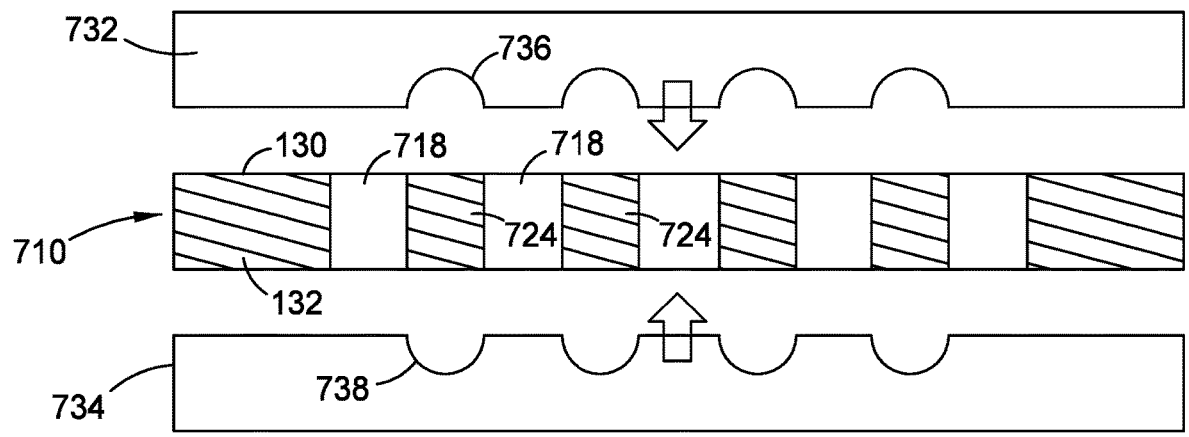
Figure 7E:
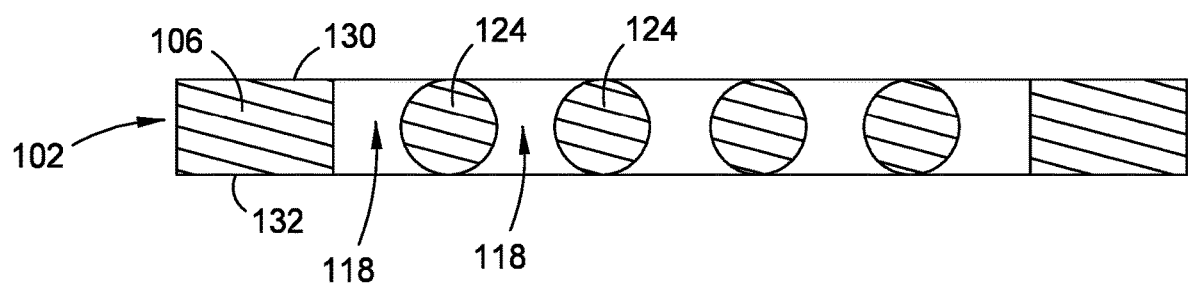

The semi-finished blank 710 is then inserted in another press equipped with upper and lower forming dies 732, 734. The upper forming die 732 includes concave upper material displacing features 736, such as a semi-circular or semi-oval grooves. Similarly, the lower forming die 734 includes concave lower material displacing features 738, such as a semi-circular or semi-oval groove. The upper material displacing features 736 are aligned with the lower material displacing features 738 such that when the upper and lower forming dies 732, 734 are pressed together sandwiching the semi-finished blank 710 as shown in FIG. 7D, the material displacing features 736, 738 press against the initial ribs 724 in a manner changes the sectional shape of the initial ribs 724 to that of the final rib 124, as shown in FIG. 7E, as the semi-finished blank 710 is transformed into the expansion card bracket 102.

Although sequence for forming the expansion card bracket 102 illustrated in FIGS. 7A-7E are formed using separate punching and forming tools, the openings may be formed in the blank 700 and the sectional profile of the material forming the rib 124 may be alternatively via a progressive stamping process, or other a cold working process.

FIGS. 8A-8D are partial sectional views of another example an expansion card bracket 102 with a folded rib 124 during different stages of fabrication. The folded rib 124 is generally configured as described with reference to FIG. 5, but may alternatively have other configurations.

Figure 8A:
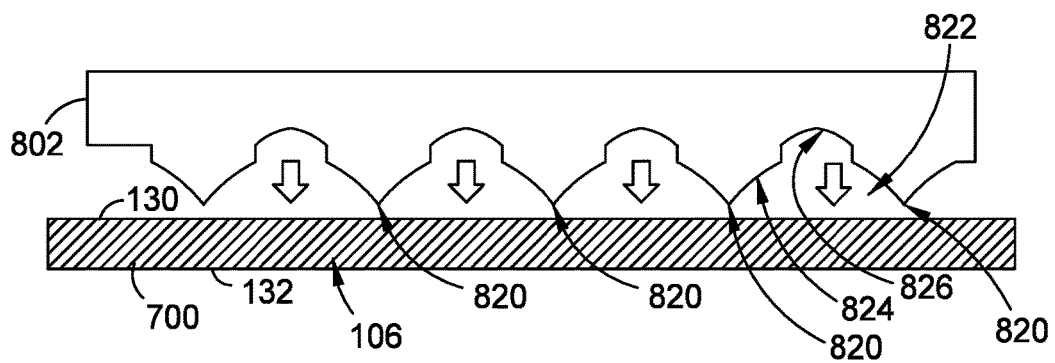
FIGS. 8A-8D are partial sectional views of another example an expansion card bracket during different stages of fabrication.

Referring first to FIG. 8A, a blank 700 from which the expansion card bracket 102 is to be formed in placed in a stamping press below a forming tool 802. Only the forming tool 802 of the stamping press is shown in FIG. 8A, but it is understood that the elongated body 106 of the blank 700 is supported on a die and that the forming tool 802 is attached to a ram. The forming tool 802 is configured to both punch openings in the blank 700 and fold the material forming the rib 124 via a cold working process, such as stamping. Alternatively, the openings may be formed in the blank 700 and the fold created in the material forming the rib 124 via a progressive stamping process or other a cold working process.

The forming tool 802 includes a plurality of forming punches 820. The forming punches 820 are driving by the ram as shown by the arrow depicted in FIG. 8A. Each of the forming punches 820 include a distal portion 824 and a proximal portion 826. The distal portion 824 has a point that pierces the elongated body 106 of the blank 700 when the forming tool 802 is advanced by the ram against the blank 700. The proximal portion 826 has a larger sectional area than the distal portion 824. The space between adjacent forming punches 820 form a 2 stage cavity 822.

Figure 8B:
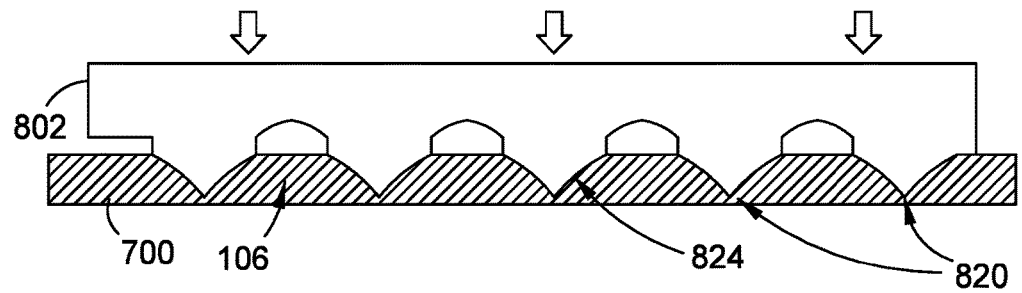
Figure 8C:
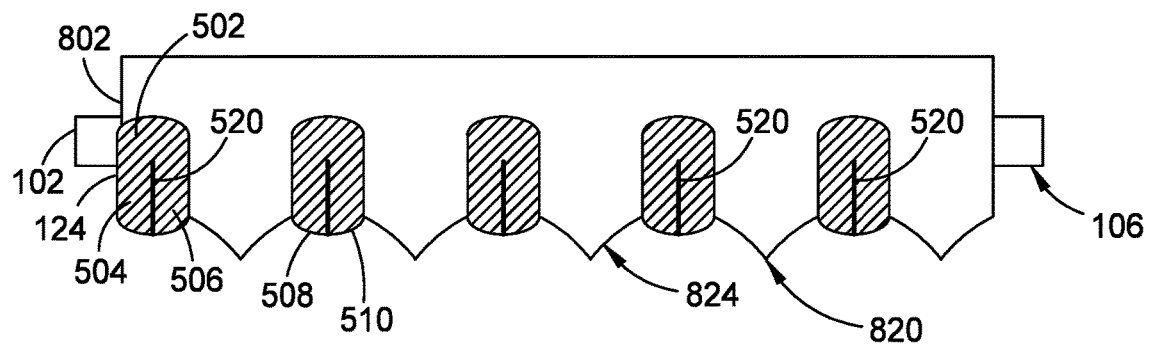
Figure 8D:
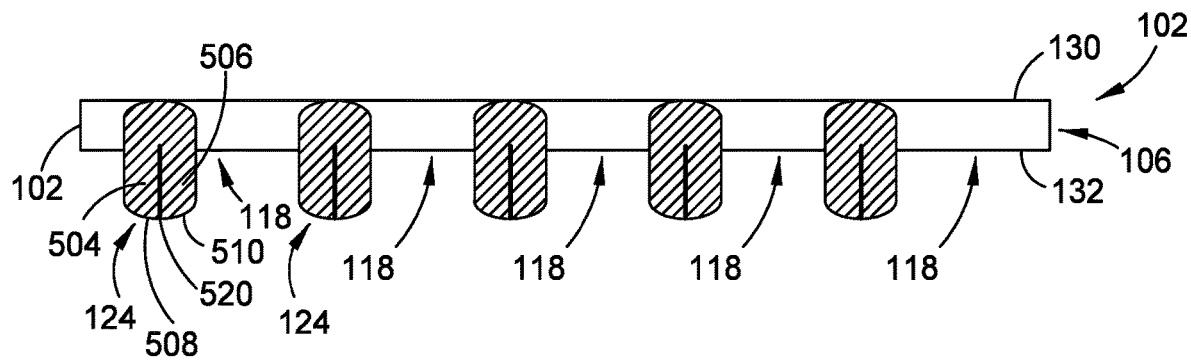

As the ram causes the forming punches 820 to pierce the elongated body 106 of the blank 700, the portion of the elongated body 106 that will become the ribs 124 are separated as the body 106 engages the distal portion 824 of the forming tool 802, as shown in FIG. 8B. As the ram further advances to cause the portion of the elongated body 106 of the blank 700 to move deep into cavity 822 such that the elongated body 106 engages the larger proximal portions 826 of the forming punches 820, the legs 504, 506 are rotated into to common parallel direction extending from the base section 502 to define the fold 520 therebetween, as shown in FIG. 8C. Once the forming tool 802 is removed, the base section 502 with folded legs 504, 506 form the ribs 124 of the expansion card bracket 102, as shown in FIG. 8D.

Additionally, although formation of the mounting tab, communication port openings, mounting holes of the expansion card bracket 102 are not illustrated in FIGS. 7A-7E and FIGS. 8A-8D, these features of the expansion card bracket 102 illustrated in FIGS. 1 and 2 are also formed in the stamping process described above.

The air flow enhancing sectional shape of the ribs, whether present in a bracket or an electronic enclosure, allows greater airflow with closer rib spacing (i.e., smaller vent holes) without sacrificing EMI protection. The close rib spacing allows enhanced fire protection and provides a finger guard that substantially prevents touching of the hot components within the computing system. Moreover, the close rib spacing reduces undesirable noise by making the flow more aerodynamic with less turbulence.

While the foregoing is directed to embodiments of the present invention, other and further embodiments of the invention may be devised without departing from the basic scope thereof, and the scope thereof is determined by the claims that follow.

What is claimed is:

1. A support bracket for an expansion card, the support bracket comprising:
   a stamped bracket having an elongated body formed from a metal strip extending between a first end and a second end, the first end having an insertion tab, the second end having a mounting tab formed at an angle relative to a plane of the elongated body, the elongated body having a first surface and a second surface facing away from the first surface, the second surface configured to receive a printed circuit board to form the expansion card;
   a plurality of vent openings formed through the elongated body; and
   a rib separating two of the vent openings, the rib having an airflow enhancing sectional area.

2. The support bracket of claim 1, wherein the airflow enhancing sectional area of the rib has a radius on a first surface side of the rib that is at least 25 percent of a material thickness of the rib.

3. The support bracket of claim 2, wherein the airflow enhancing sectional area of the rib has a radius on a second surface side of the rib that is at least 25 percent of the thickness of the rib.

4. The support bracket of claim 1, wherein the airflow enhancing sectional area of the rib has a full radius on a first surface side of the rib.

5. The support bracket of claim 1, wherein the airflow enhancing sectional area of the rib has a chord that is longer than a thickness of the rib.

6. The support bracket of claim 5, wherein the chord is perpendicular to the first surface of the elongated body.

7. The support bracket of claim 5, wherein the chord is not perpendicular to the first surface of the elongated body.

8. The support bracket of claim 1, wherein a portion the rib extends beyond the first and/or second surface of the elongated body.

9. The support bracket of claim 8, wherein the airflow enhancing sectional area of the rib includes a fold.

10. The support bracket of claim 1, wherein the airflow enhancing sectional area of the rib is formed by cold working.

11. The support bracket of claim 1, wherein the airflow enhancing sectional area of the rib is formed after forming the rib by stamping.

12. The support bracket of claim 1 further comprising:
   communication port openings formed through the elongated body between the first and second surfaces, the communication port openings configured to allow an electrical connector to engage with a sockets through the elongated body.

13. A support bracket for an expansion card, the support bracket comprising:
   a bracket having an elongated body in the form of an L-shaped strip extending between a first end and a second end, the first end having an insertion tab, the second end having a mounting tab formed at an angle relative to a plane of the elongated body, the elongated body having a first surface and a second surface facing away from the first surface, the second surface configured to receive a printed circuit board to form the expansion card;
   a plurality of vent openings formed through the elongated body; and
   a rib separating two of the vent openings, the rib having an airflow enhancing sectional area, wherein the elongated body is formed by casting, forging, 3-D printing, die casting, or injection molding.

14. An expansion card comprising:
   a printed circuit board (PCB);
   sockets disposed on the PCB;
   electronics disposed on the PCB and coupled to the sockets; and
   a bracket coupled to the PCB, the bracket further comprising:
      an elongated body extending between a first end and a second end, the first end having an insertion tab, the second end having a mounting tab formed at an angle relative to a plane of the elongated body, the elongated body having a first surface and a second surface facing away from the first surface, the PCB extending away from the second surface in a direction perpendicular to the plane of the elongated body;
      communication port openings formed through the elongated body and allowing connection with the sockets through the elongated body;
      a plurality of vent openings formed through the elongated body; and
      a rib separating two of the vent openings, the rib having an airflow enhancing sectional area.

15. The expansion card of claim 14, wherein the airflow enhancing sectional area of the rib has a radius on a first surface side of the rib that is at least 25 percent of a material thickness of the rib.

16. The expansion card of claim 14, wherein the airflow enhancing sectional area of the rib has a chord that is longer than a thickness of the rib.

17. The expansion card of claim 16, wherein a portion the rib extends beyond the first and/or second surface of the elongated body.

18. The expansion card of claim 14, wherein the airflow enhancing sectional area of the rib includes a fold.

19. The expansion card of claim 14, wherein the elongated body of the bracket is metal.

20. The expansion card of claim 14, wherein the printed circuit board is configured as an audio card, a sound card, a video card, a network interface card, a serial and parallel cards, a USB expansion card, a Firewire card, a storage card, a modem card, a wireless card, a cellular card, a TV tuner card, or a video capture card.

* * * * *